(12) United States Patent
Rygh et al.

(10) Patent No.: US 7,426,604 B1
(45) Date of Patent: Sep. 16, 2008

(54) VIRTUAL OUTPUT BUFFER ARCHITECTURE

(75) Inventors: Hans Olaf Rygh, Oslo (NO); Finn Egil Hoeyer Grimnes, Oslo (NO); Brian Edward Manula, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 283 days.

(21) Appl. No.: 11/453,759

(22) Filed: Jun. 14, 2006

(51) Int. Cl.
*G06F 5/10* (2006.01)
*G06F 12/00* (2006.01)

(52) U.S. Cl. .......................... 711/101; 711/147; 710/52; 710/53; 710/54; 710/55; 710/56

(58) Field of Classification Search ........................ None
See application file for complete search history.

(56) References Cited

U.S. PATENT DOCUMENTS 6,526,452 B1 * 2/2003 Petersen et al. ............. 709/251
6,937,606 B2 * 8/2005 Basso et al. ................. 370/412
7,237,016 B1 * 6/2007 Schober ...................... 709/223
2003/0037178 A1 * 2/2003 Vessey et al. ............... 709/319
2004/0064664 A1 * 4/2004 Gil ............................. 711/170
2006/0143334 A1 * 6/2006 Naik ........................... 710/56
2007/0050564 A1 * 3/2007 Gunna et al. ................ 711/146

* cited by examiner

*Primary Examiner*—Than Nguyen
(74) *Attorney, Agent, or Firm*—Park, Vaughan & Fleming LLP

(57) ABSTRACT

A buffer architecture enables linked lists to be used to administer virtual output queue buffering. The buffer has three random access memories (RAMs). A data RAM holds data. A free RAM holds a linked list of entries defining free space in the data RAM. Destination RAM holds a linked list of entries defining data in the data RAM to be forwarded to a destination.

19 Claims, 16 Drawing Sheets

VIRTUAL OUTPUT BUFFER ARCHITECTURE

BACKGROUND

The invention relates to link list buffer architectures, for example for use in high performance switches.

A critical parameter in high performance switches for computer buses, such as PCI Express and Infiniband, is the underlying buffer architecture.

In an input-output buffer architecture, packets are sorted and stored in partitions of the output buffer, according to their destination. Packets to different destinations can therefore be independently forwarded, even when the buffers are implemented with pure First In First Out (FIFO) storage elements. An input-output buffer architecture can be implemented using storage elements such as FIFOs that are easy to handle, and can provide independence between packet streams at the cost of increased buffer space.

A Virtual Output Queue (VOQ) buffer architecture, on the other hand, uses just one buffer. Independence between packet streams can be provided by using a random access memory. (RAM) storage element for implementing the buffer. As any entry of a RAM can be freely accessed, packets to different destinations can be independently forwarded directly from the buffer, without the need for a costly output buffer. A conventional VOQ buffer architecture, however, causes problems in the case of high performance switches in which packets may be received every cycle. Specifically, when the packet is stored, both the entry for the packet itself and an entry for a pointer to it need to be written at the same time. As the addresses of these two entries are not the same, they will either have to be written in two cycles, or a RAM with more than one write port must be used and RAMs with more than one read and one write port are either costly in terms of size, or not available for all technologies.

The present invention seeks to provide an improved buffer architecture.

SUMMARY

An embodiment of the invention can provide a buffer architecture that enables linked lists to be used in administering a VOQ buffer in a wide range of applications, for example in a high performance switch where packets might be received and forwarded every cycle.

An embodiment of the invention can have a buffer that includes a first memory having a plurality of entries operable to contain packet data to be buffered, a second memory having a corresponding plurality of entries operable to contain a list of first memory packet data entries not in use and a third memory having a corresponding plurality of entries operable to contain a list of first memory packet data entries in use.

An embodiment of the invention can provide an apparatus including such a buffer. An example of such an apparatus is an interconnect apparatus, for example a switch, which can include an input port, at least one output port with the buffer connected to the input port and the or each of the output ports.

An embodiment of the invention can provide a method including buffering packets received at the buffer in entries in a first memory, maintaining in corresponding entries in a second memory a list of free first memory entries and maintaining in corresponding entries in a third memory a respective list of first memory entries containing packets to be forwarded to the or each destination.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Example embodiments will now be described by way of example only with reference to the accompanying Figures in which.

Figure 1:
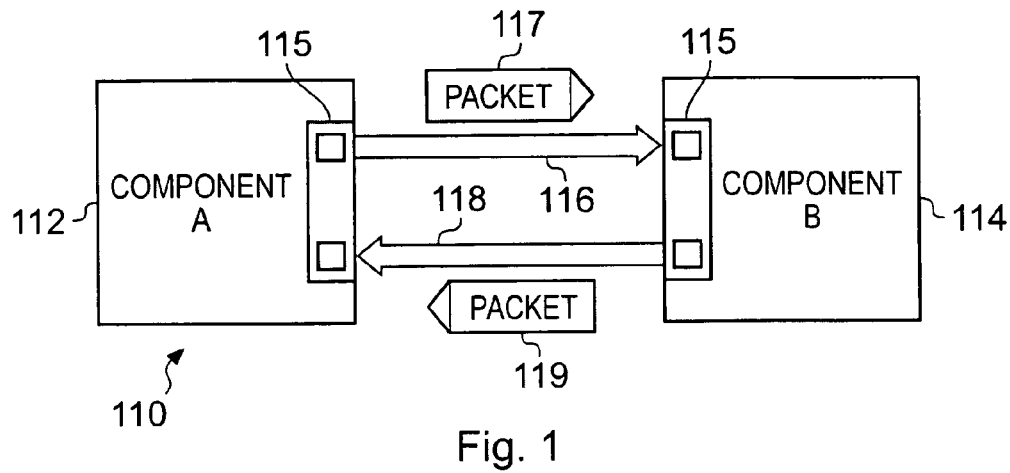
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF EMBODIMENTS

An example of a Virtual Output Queue (VOQ) buffer architecture will be described in the following in which a single buffer is used for input and output buffering. Independence between packet streams can be provided using RAM storage elements for implementing the buffer. Because an entry of a RAM can be freely accessed, packets to different destinations can be independently forwarded directly from the single buffer, without the need for the costly output buffer. The example described herein uses three RAMs to implement the buffer.

An example application of the buffer will be described in the context of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are power management, quality of service (QoS), hot-plug/hot-swap support, data integrity, and error handling. PCI Express is also backwards compatible with the software models used to describe PCI, such that PCI Express hardware can be detected and configured using PCI system configuration software implementations with no modifications.

FIG. 1 provides a schematic overview of a basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 110 includes two components 112 and 114, each including a respective transmit and receive port pair 113 and 115. Two uni-directional, low-voltage, differentially driven channels 116 and 118 connect the ports of the components, one channel in each direction. The channel pair can be referred to as a lane. The channels 116 and 118 each carry packets 117 and 119 between the components. According to the PCI Express 1.0 specification, each lane provides a data transfer rate of 2.5 Gigabits/second/lane/direction. For circumstances where this data bandwidth is insufficient, to scale bandwidth, a link may aggregate multiple Lanes denoted by xN where N may be any of the supported link widths. An x8 link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
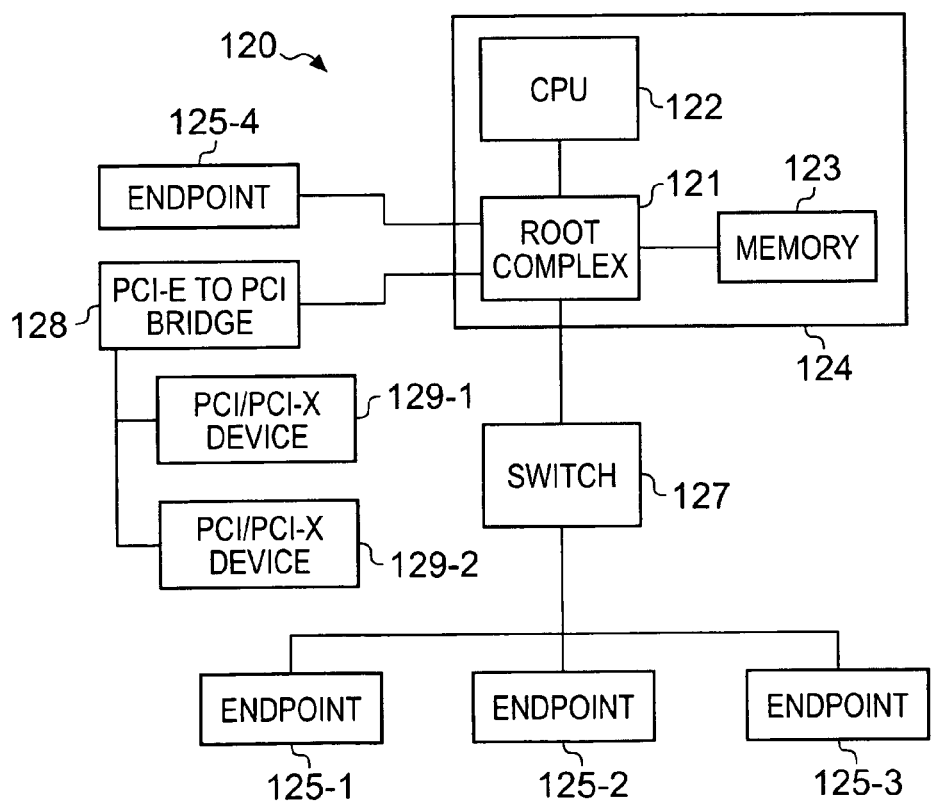
FIG. 2 is a schematic representation of an example of a PCI Express fabric topology.

FIG. 2 is a schematic representation of an example of a PCI Express fabric topology 120. A fabric is composed of point-to-point links that interconnect a set of components. In the example of FIG. 2, there is shown a single fabric instance 120 referred to as a hierarchy, composed of a root complex 121, multiple endpoints 125 (such as I/O devices 125-1, 125-2, 125-3 and 125-4), a switch 127, and a PCI Express to PCI Bridge 128, all interconnected via PCI Express links. The root complex 121 can be connected to a CPU 122 and memory 123 subsystem which requires access to the I/O facilitated by the PCI Express fabric. The combination of root complex, CPU and memory can be referred to as a host 124. Each of the components of the topology is mapped in a single flat address space and can be accessed using PCI-like load/store accesses transaction semantics.

A root complex 121 is the root of an I/O hierarchy that connects the CPU/memory subsystem to the I/O. As illustrated in FIG. 2, a root complex 121 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 125 (e.g., 125-1, 125-2, 125-3, 125-4) is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or Infiniband Host Channel Adapter (HCA).

FIG. 2 illustrates that a PCI Express to PCI Bridge 128 can provide a connection between a PCI Express fabric and a PCI/PCI-X hierarchy. Thereby, conventional PCI/PCI-X devices 129-1, 129-2 may be connected to the PCI Express fabric and accessed by a host including a PCI Express root complex.

Figure 3:
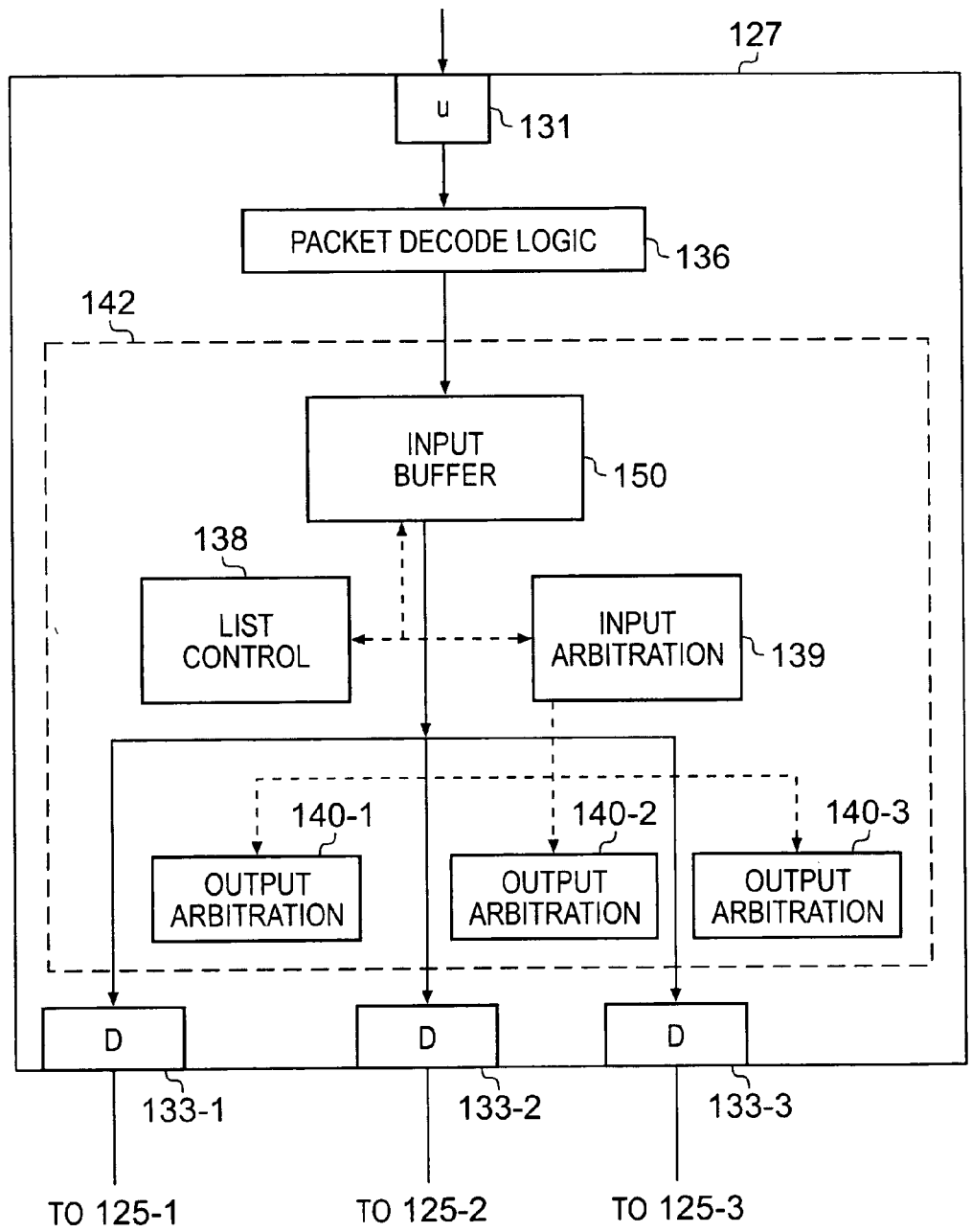
FIG. 3 is a schematic representation of an interconnect apparatus in the form of a switch.

An example of an interconnect apparatus, or device, in the form of a switch 127 is a logical assembly of multiple virtual PCI Express to PCI Express bridge devices as illustrated in FIG. 3. As shown in FIG. 3, an upstream port 131 which connects in the direction of a host connects to a number of downstream ports 133-1, 133-2, and 133-3 via a switch fabric 142, which is represented schematically in FIG. 3.

The switch matrix includes a buffer 150 that receives packets from an input port via packet decode logic (PDL) 136. The PDL 136 is operable to decode received packets to extract routing information for a received packet to identify an intended destination for a packet. The packet decode logic includes destination lists identifying possible destinations and uses these lists to determine the packet routing. A destination could be a final end-point destination, but could also, for limiting a number of destination lists, be a group of end-point destinations, for example a group containing the end-point destinations that are reached via a given local output port (e.g., one of the ports 131-1 to 131-3).

The list control logic 138 is operable to control the operation of the buffer 150 and in particular, lists maintained in the input buffer 150, as will be described in the following. The input arbitration logic 139 and the output arbitration logic 140-1, 140-2, and 140-3 are each operable to provide flow control for a respective port. The input arbitration logic 139 can arbitrate flow control for packets received at the input port with the respective output arbitration logic for the appropriate output port(s) for the packets. In the present example, separate arbitration logic is provided for each port. In other words, if there are multiple input ports, each input port is provided with its own arbitration logic. However, in other examples, the arbitration logic could be shared between ports (for example with first arbitration logic for one or more input ports and second arbitration logic for one or more output ports).

The list control logic 138, the input arbitration logic 139 and the output arbitration logic 140 can be implemented using hardware, firmware or software logic as appropriate.

In order to simply FIG. 3 and the explanations below, it is to be noted that the packet decode logic 136, buffer 150, list control logic 138, input arbitration logic 139 and output arbitration logic 140-1, 140-2, and 140-3 are represented for packets that are to be passed in a downstream direction from an upstream port 131 to a downstream port 133. It should be understood that a comparable set of elements can also be provided for packets that are to be passed in the opposite, upstream, direction from a downstream port 133 to an upstream port 131.

An example configuration of the buffer 150 will be described in the following.

Although a simple FIFO buffer would be easy to handle, packets would need to be stored in one end and read out from the other end of the buffer. The example of a Virtual Output Queue (VOQ) buffer architecture described in the following, however, enables a packet to be read out from any part of a buffer. An example buffer architecture described in the following enables a buffer entry from which a packet is forwarded to be made available for reuse. The example buffer architecture described in the following employs three RAMs.

The example described in the following uses linked lists to administer the buffer locations that are, and are not, free. In simple terms, a linked list includes the provision of a field for each buffer entry that can hold a pointer to another entry (e.g. to identify the address of another entry). A number of such entries pointing to each other make up a linked list. Entries in an input buffer that are not in use can be linked together in one or more lists (free lists), for example with a separate list for each data source and/or data type. Entries holding packet data can be linked together in one or more separate lists (destination lists), for example with one list for each destination and/or data type. When a packet is stored, entries from a free list are used, and appended to a destination list for the destination of the stored packet. When a packet is forwarded, the freed entries are taken back to the free list concerned.

By providing three RAMs for implementing the input buffer, the free list(s) and the destination list(s), respectively, efficiency problems that would otherwise be encountered by having the data and pointers in a single RAM are alleviated.

By providing a separate RAM for the packet data, the pointer data can be held separately, facilitating the use of linked lists for administrating a VOQ buffer architecture in a high performance switch where packets might be received every cycle.

Furthermore, by providing separate RAMs for the pointers for the lists of entries in use and for the pointers for the lists of entries not in use, a switch can forward packets at the same rate as the rate at which they can arrive, e.g., every cycle. This means that where a packet is stored at the same time as another packet is being forwarded, the respective entries of two different pointers can be accessed for reading concurrently. In other words, the pointer to where the incoming packet will be stored, and a pointer to where the outgoing packet is located can be accessed concurrently.

Figure 4:
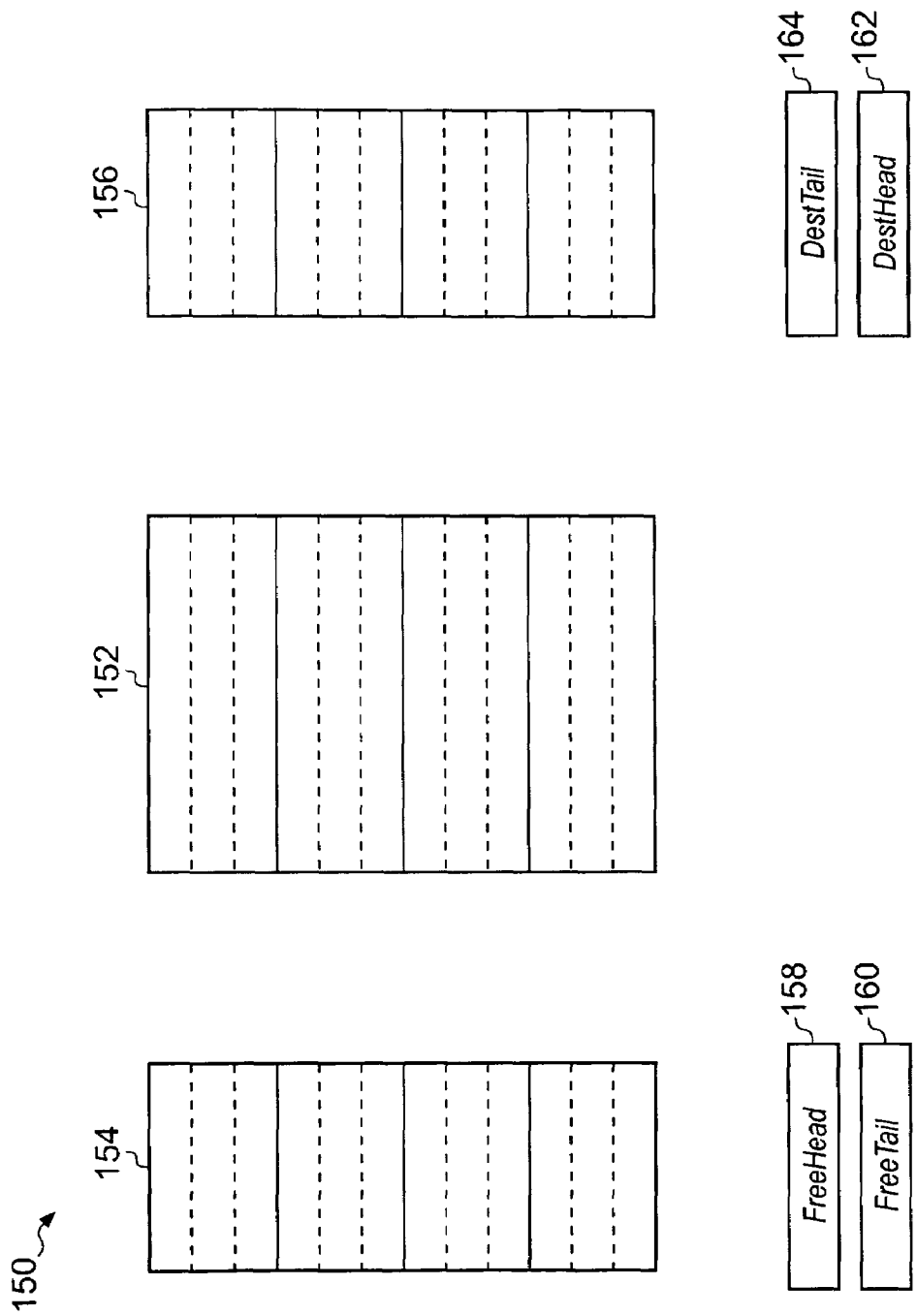
FIG. 4 is a schematic representation of components of a buffer.

FIG. 4 is a schematic representation of component of an example of a VOQ input buffer 150 that comprises three RAMs:

1) a packet RAM 152, having entries for holding packet data;

2) a free RAM 154, used for identifying packet RAM 152 entries not in use; and 3) a destination RAM 156, used for identifying packet RAM 152 entries in use.

FIG. 4 also illustrates a free head pointer 158 used to identify the head of a linked list of entries in the free RAM 154 identifying free locations in the packet RAM 152, and a free tail pointer 160 used to identify the tail of a linked list of entries in the free RAM 154 identifying free locations in the packet RAM 152. In this example, where there is a single source of packets (i.e. the upstream port) there is one free head pointer 158 and one free tail pointer 160 that apply for all destinations.

Also shown are a destination head pointer 162 and a destination tail pointer 164. In this example, there is one destination head pointer 162 and one destination tail pointer 164 for each destination, although only one of each is shown in FIG. 4. In other words, a separate pointer pair, having a destination head pointer 162 and a destination tail pointer 164, is provided for each possible destination for packets in the packet RAM 152. The destination head pointer 162 for a given destination is used to identify the head of a linked list of entries in the destination RAM 156 identifying locations in the packet RAM 152 that contain packets for that destination. The destination tail pointer 164 for that destination is used to identify the tail of the linked list of entries in the destination RAM 156 identifying locations in the packet RAM 152 that contain packets for that destination.

The pointers 158, 160, 162 and 164 can be provided using hardware or firmware registers. This can enable rapid access and/or modification of the pointers. Alternatively, they could be held in memory (e.g., RAM) where this is less expensive.

The free and destination lists in the present example can each hold information for packets having different data types. There is one free list per source of packets and one destination list per destination. However, in another example, separate free and/or destination lists could be provided for each of respective, different data types. Each list to be maintained can be provided with respective head and tail pointers.

As indicated above, the lists that are maintained in the input buffer 150 are controlled by the list control logic 138. Accordingly, in the following description, it is to be understood that the storage of information in the RAMs 152, 154, 156, the reading of information from the RAMs 152, 154, 156, and the maintenance of the various pointers 158, 160, 162, 164 is under the control of the list control logic 138.

The packets of data received at the buffer are stored in the packet RAM 152 of the input buffer 150. In use, the contents of the packets can be scattered throughout the packet RAM 152, with successive packet fragments being placed in any location of the packet RAM 152. The linked lists in the free RAM 154 and the destination RAM 156 are used to keep track of the locations of the fragments, so that they can be gathered together when the packets are forwarded.

The input buffer 150 thus comprises the three RAMs 152, 154 and 156 and the pointers 158, 160, 162 and 164. Each of the three RAMs 152, 154 and 156 has the same number of entries, effectively the number of entries for the input buffer 150. Corresponding entries in the RAMs 152, 154 and 156 can be identified, or addressed, by corresponding addresses or address offsets. Each entry in the free RAM 154 and the destination RAM 156 has a number of bits necessary to address each entry in the RAMs. In the following, as each of the corresponding entries has effectively the same address (whether this be the same absolute address, or the same offset) reference will be made in the following to an input buffer address to refer to the respective addresses for the packet RAM 152, the free RAM 154 and the destination RAM 156. In other words, where reference is made in the following to an input buffer address, this means an address or set of addresses (e.g., having a corresponding offset) that can be used to address each of the corresponding locations in the packet RAM 152, the free RAM 154 and the destination RAM 156.

The content of the free RAM 154 and the destination RAM 156 form linked lists. Each entry in the free RAM 154 identifies another entry in the free RAM 154, and effectively the corresponding entries in the packet RAM 152 and in the destination RAM 156 (e.g., by containing an input buffer address). Each entry in the destination RAM 156 identifies another entry in the destination RAM 156, and effectively the corresponding entries in the packet RAM 152 and in the free RAM 154 (e.g., by containing an input buffer address).

The aforementioned pointers 158, 160, 162 and 164 can identify the heads (e.g., the addresses of the first elements of the lists) and the tails (e.g., the addresses of the last elements of the lists) of the linked lists in the free RAM 154 and in the destination RAM 156 by, for example, containing an input buffer address.

The operation of the input buffer will now be summarized before being described in more detail with reference to FIGS. 5 to 17.

As indicated above, the free RAM 154 holds the list of free locations (the free list). When a packet is received at the input buffer 150 (e.g., from an input port 131), it is written into the packet RAM 152. The identity (e.g., the address) of the locations where the packet is to be written, is taken from the free RAM 154 and head pointers provided for the free RAM 154. The free head pointer 158 holds the input buffer write address for the first line of the packet. The free RAM 154 entry identified, or pointed to, by the free head pointer 158 holds the input buffer write address for the next line at which the packet should be stored. At each cycle, the contents of the free head pointer 158 is set to the contents of this free RAM 154 entry, indicating the new head of the linked list in the free RAM 154.

When a packet is forwarded to a destination port from an entry in the packet RAM 152, the free RAM 154 entries of the forwarded packet are moved back to the free list. The freed entries are appended to the end of the free list, one entry at each read cycle, by writing the input buffer read address of the packet freed from the packet RAM 152 into the free RAM 154 entry pointed to by a free tail pointer 160. The contents of the free tail pointer 160 are then also set to the input buffer read address, indicating the new tail of the list.

At initiation, the entries of the free RAM 154 may be linked together, for example sequentially. In time the entries will be linked together in an unstructured and seemingly random way.

The destination RAM 156 holds the destination lists. When a packet is received at the input buffer (e.g., from an input port), the input buffer address of the locations into which the packet is written into the packet RAM 154 are stored in the destination RAM 156. As mentioned above, there is a destination list for each possible destination of the packet. Each destination list has its own destination tail pointer 164 pointing to the end of that list. At each write cycle, the contents of the destination RAM entry pointed to by the destination tail pointer 164 for the destination of the packet concerned is set to the input buffer write address for that packet (i.e., the input buffer write address corresponding to the packet RAM 152 location at which the packet is written in that cycle). The contents of the destination tail pointer 164 is then also set to the input buffer write address, moving the pointer to the new tail of that destination list.

When a packet is forwarded from the input buffer 150 (e.g., to a destination port), the input buffer read addresses for the packet being forwarded is taken from the destination RAM 156 and the destination head pointer 162 for the destination concerned. As indicated above, the list of packets for a given destination has a destination head pointer 162 to the head of that list. This destination head pointer 162 holds the input buffer read address of the first line of the packet in the packet RAM 152 for this destination. The destination RAM 156 entry pointed to by the destination head pointer 162 concerned holds the input buffer read address of the next line of the packet in the packet RAM 152. At each read cycle, the content of the destination head pointer 162 concerned is set to the contents of the entry in the destination RAM 156 pointed to by the destination head pointer 162 concerned, moving the pointer to the new head of the list. There is no need to initialize the destination RAM 156.

Figure 5:
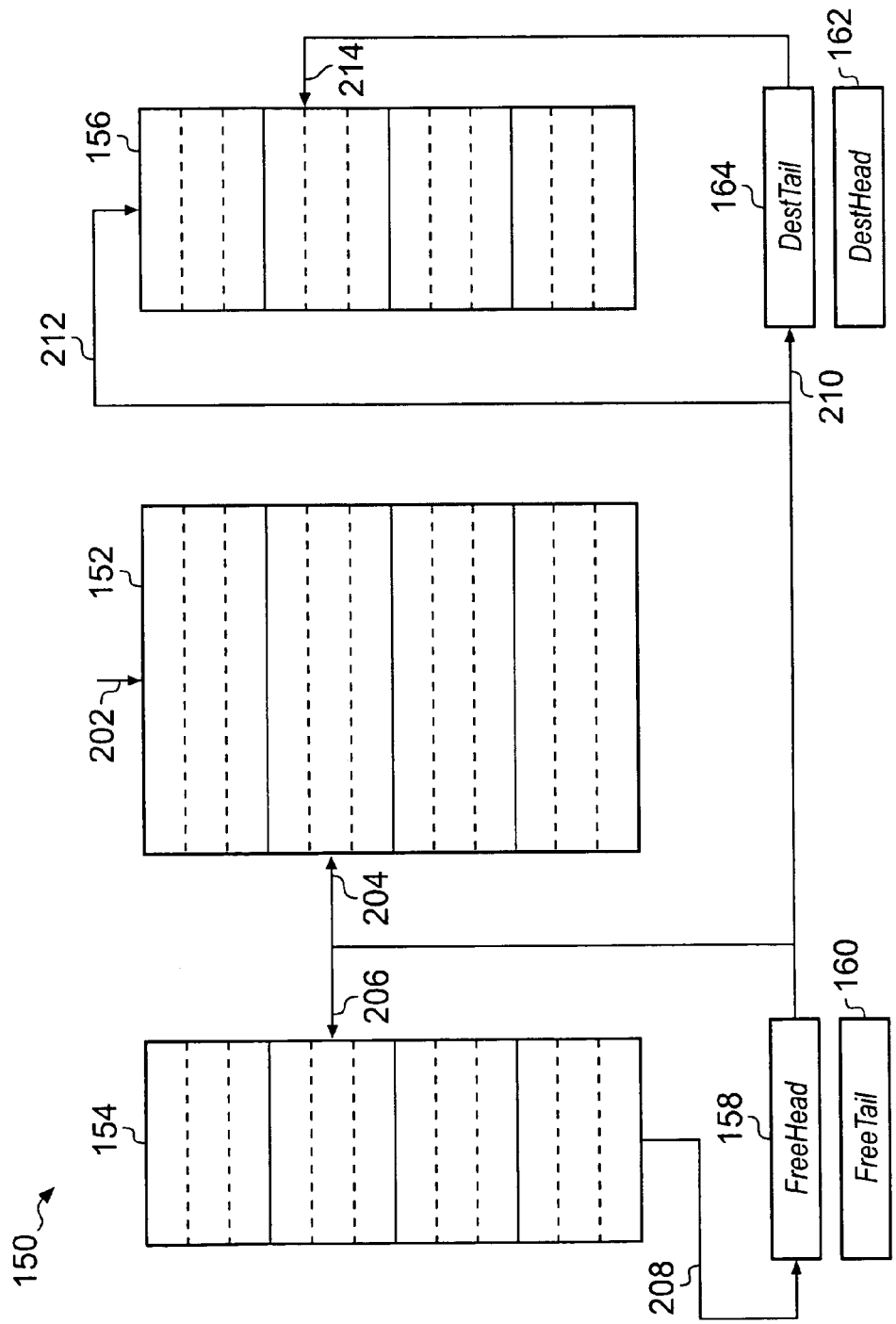
FIGS. 5 to 17 are schematic representations to explain the operation of the buffer of FIG. 4.

FIG. 5 provides an overview of the operation of the input buffer 150 on receipt of a packet. When a packet is received 202 at the input buffer 150 (e.g., from an input port 131) it is written into the packet RAM 152 at a write address 204 identified by the current content of the free head pointer 158. This is the same address as the read address 206 of the free RAM 154 used to find the next free location (i.e. the next content 208 of the free head pointer). As the entries of the packet RAM 152 are filled, they are appended to the end of the destination list for the intended destination of the packet, with the content of the current free head pointer 158 being used to replace 210 the content of the destination tail pointer 164 in the next write cycle. The free head pointer 158 content is also stored 212 in the destination RAM 156 in the location identified 214 by the content of the current destination tail pointer 164. The write address 214 of the destination RAM 156 is identified by the current content of destination tail pointer 164, while the data value to be stored will be pointed to by the destination tail pointer for the relevant destination in the next write cycle.

An example of operation of the input buffer 150 on receipt of a packet will now be described in more detail with reference to FIGS. 6 to 11. In this example, for reasons of ease of explanation, it is assumed that there is only one possible destination, and therefore that only one destination list is held in the destination RAM 156, and that there is only one destination head pointer 162 and one destination tail pointer 164. It will readily be apparent that the described example could be modified to provide separate destination lists for each of a plurality of destinations by providing a respective destination head pointer 162 and destination tail pointer 164 for each destination, with the appropriate pointers being employed for a given packet according to its destination as determined by the packet decode logic 136 shown in FIG. 3.

Figure 6:
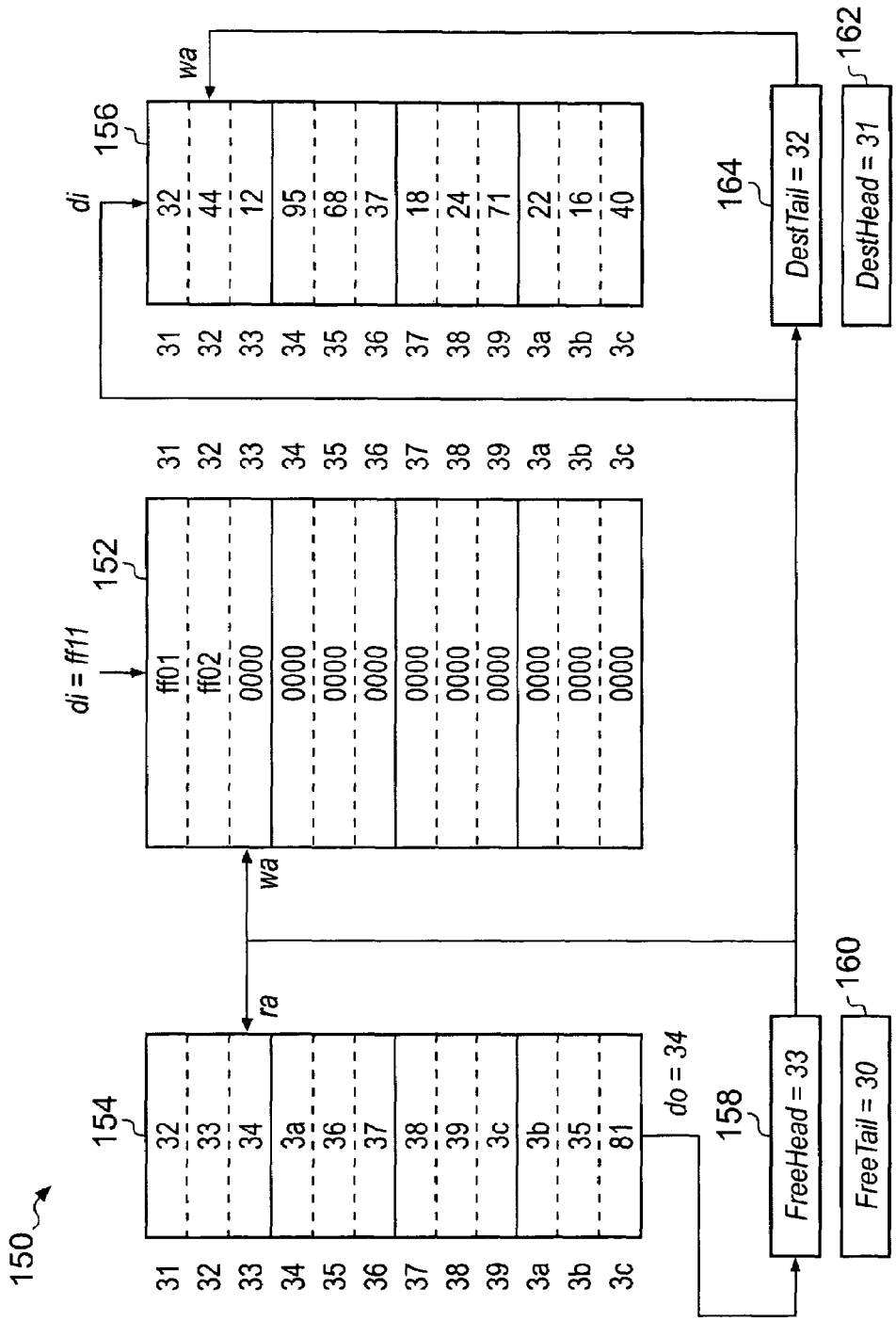

FIG. 6 represents the status at the start of a first write cycle for a new packet. At this time, as shown in FIG. 6, a packet using two entries is already stored in the packet RAM 152, in location 31 and 32. At this time, the destination list contains the two entries, 31 and 32. The destination head pointer 162 points to 31 and the value of destination RAM 156 entry 31 is 32, linking them together, and the destination tail pointer 164 points to the last entry 32. The other entries in the destination RAM 156 hold values that are results of earlier transactions. The free List in the free RAM 154 starts at 33 (which corresponds to the current content of the free head pointer 158), wraps around and ends at 30 (which corresponds to the current content of the free tail pointer 160). The elements in the free list are not all sequentially linked together, for example the elements 3a and 3b are linked in between element 34 and 35, which is caused by some earlier transactions. The packets in this example have 16 bit values, unused entries for clarity being set to 0000.

In this example, a packet that is stored has five lines (i.e. the content that is to be stored in each cycle) having the values ff01 to ff05.

As mentioned above, FIG. 6 illustrates the status at the beginning of a first write cycle for a new packet. The first part, or line, of the new packet has the value ff11. It is written into the entry identified by the free head pointer 158, i.e. location 33. The next element of the free list is found in the entry of free RAM 154 pointed to by the free head pointer 158 content (i.e. location 33). The content of that entry in the free RAM 154 (i.e., here the content of location 33, namely the value 34) will become the next content of the free head pointer 158. The stored element is appended to the end of the destination list by writing its location (33) into the destination RAM 156 entry (location 32) pointed to by the destination tail pointer 164. The content of the free tail pointer 160 and the destination head pointer 162 are not changed when a packet is just stored in the input buffer 150, that is, when no forwarding of a packet from the input buffer 150 is taking place.

Figure 7:
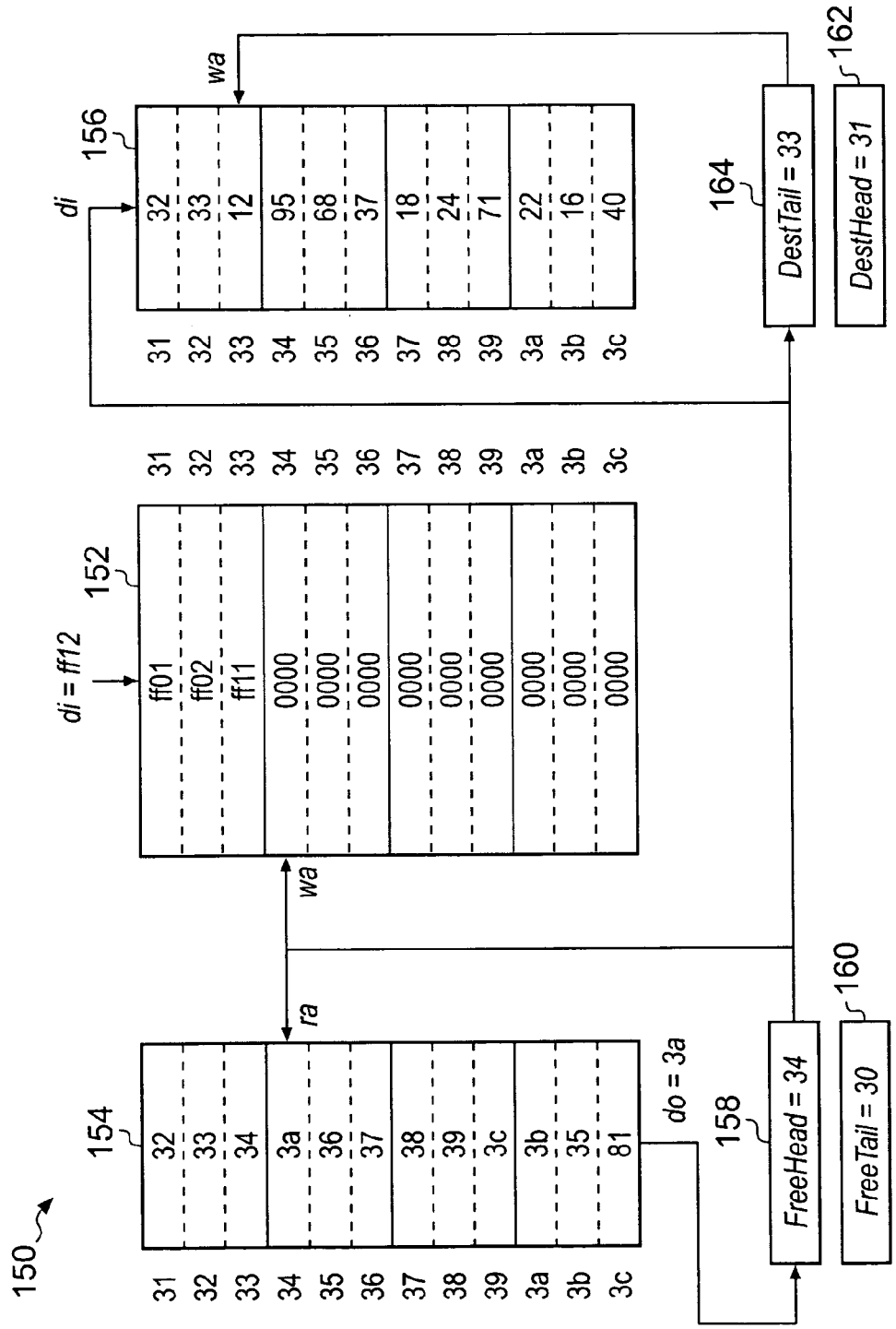

FIG. 7 illustrates the status at the end of the first write cycle following steps as described above with respect to FIG. 6 whereby the first part of the packet having the value ff11 has been stored in the packet RAM 152 at location 33 and the free head pointer 158, the destination tail pointer 164, the free RAM 154 and the destination RAM 156 have been updated. FIG. 7 also illustrates the status prior to a second write cycle for the packet, for which the data to be stored has the value ff12.

Figure 8:
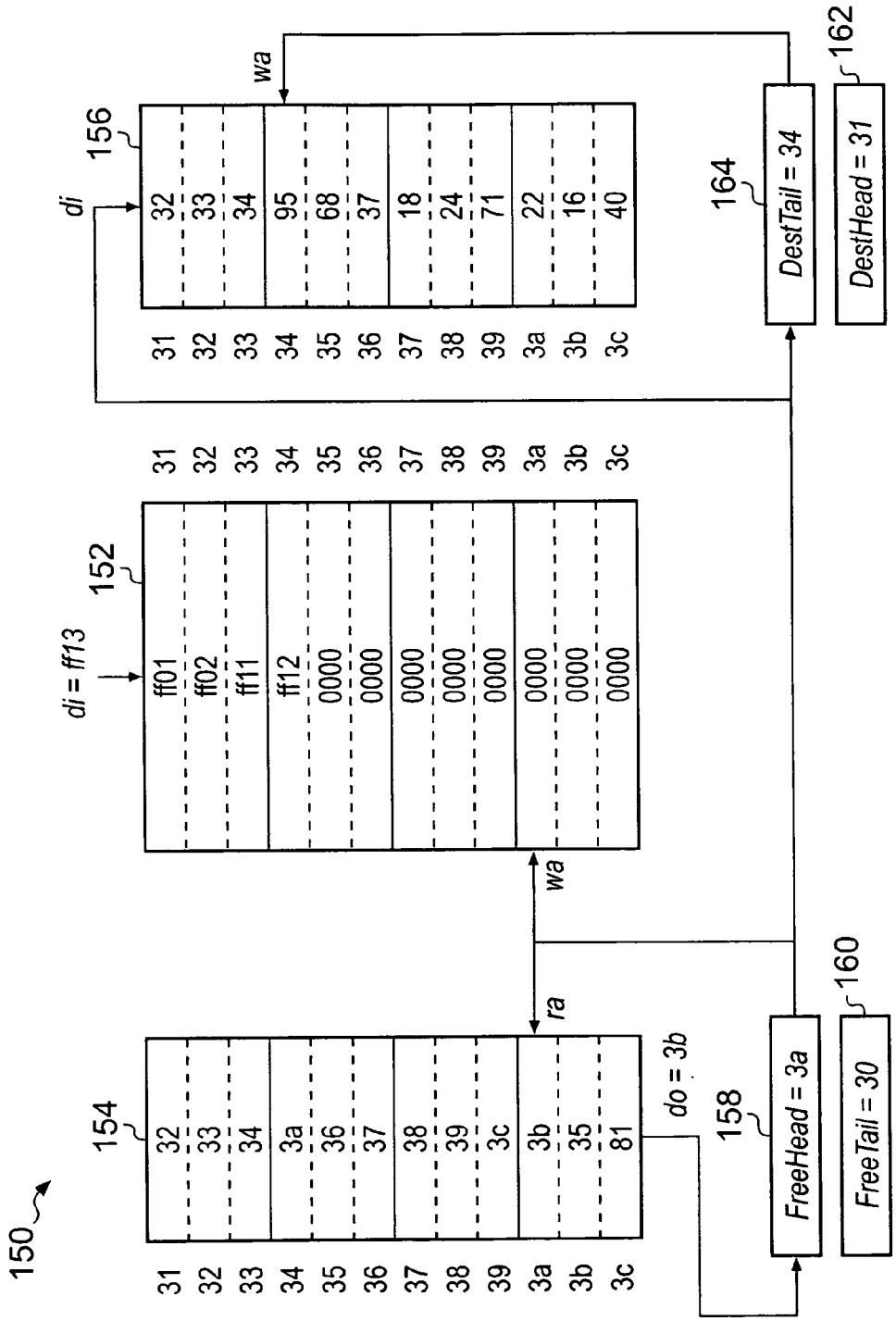

FIG. 8 illustrates the status at the end of the second write cycle following steps as described above with respect to FIG. 6, but starting from the status represented in FIG. 7, whereby the second part of the packet having the value ff12 has been stored in the packet RAM 152 at location 34 and the free head pointer 158, the destination tail pointer 164, the free RAM 154 and the destination RAM 156 have been updated. FIG. 8 also illustrates the status prior to a third write cycle for the packet, for which the data to be stored has the value ff13.

Figure 9:
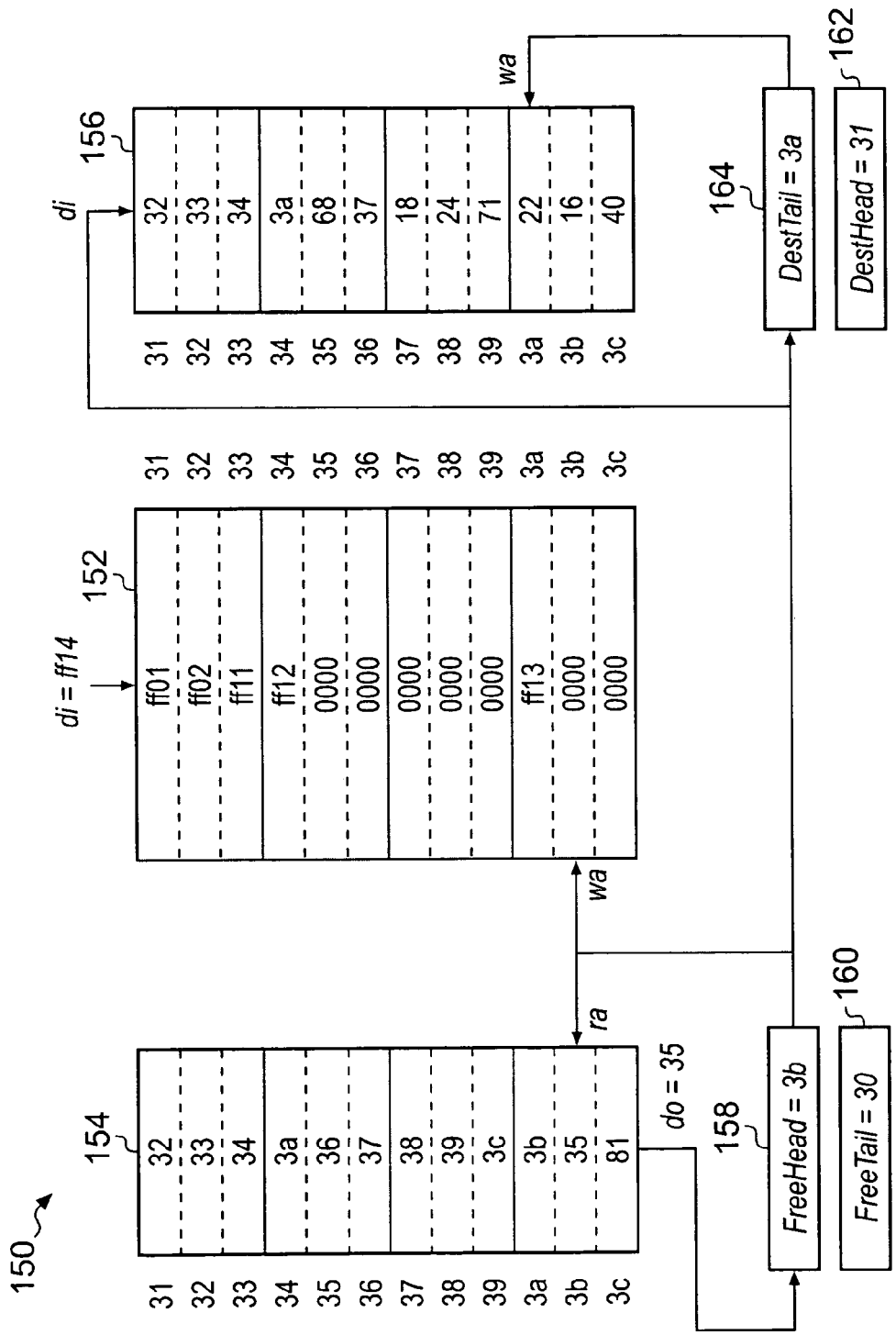

FIG. 9 illustrates the status at the end of the third write cycle following steps as described above with respect to FIG. 6, but starting from the status represented in FIG. 8, whereby the packet having the value ff13 has been stored in the packet RAM 152 at location 3a and the free head pointer 158, the destination tail pointer 164, the free RAM 154 and the destination RAM 156 have been updated. FIG. 9 also illustrates the status prior to a fourth write cycle for the packet, for which the data to be stored has the value ff14. As shown in FIG. 9, the value ff13 has been written into a location that is not sequential to the former write locations (i.e. there was a jump from location 34 to location 3a). The discontinuous linking is also reflected in the destination list.

Figure 10:
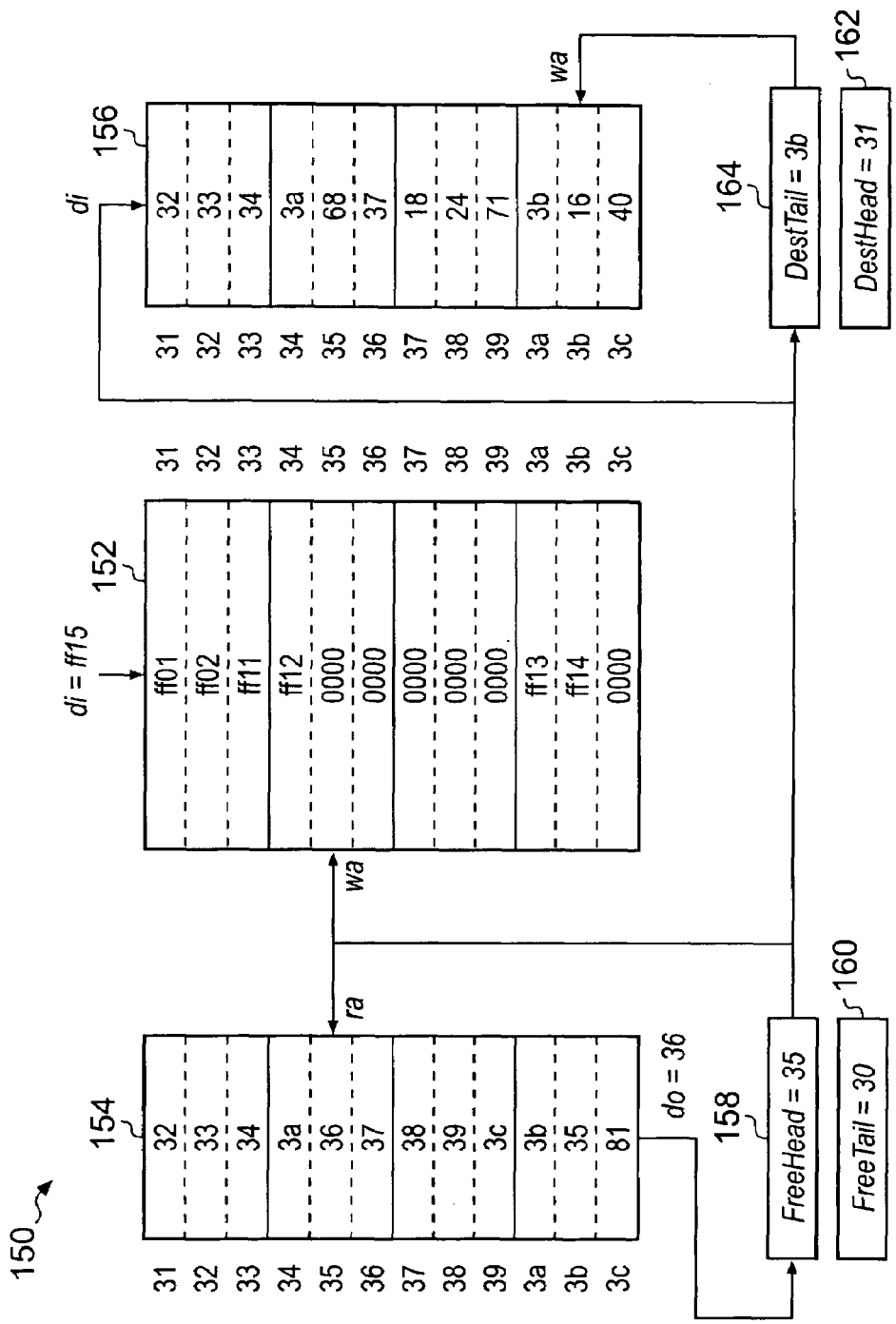

FIG. 10 illustrates the status at the end of the fourth write cycle following steps as described above with respect to FIG. 6, but starting from the status represented in FIG. 9, whereby the packet having the value ff14 has been stored in the packet RAM 152 and the free head pointer 158, the destination tail pointer 164, the free RAM 154 and the destination RAM 156 have been updated. After the fourth write cycle, as shown in FIG. 10, the free head pointer content has jumped back to entry 35. FIG. 10 also illustrates the status prior to a fifth write cycle for the packet, for which the data to be stored has the value ff15.

Figure 11:
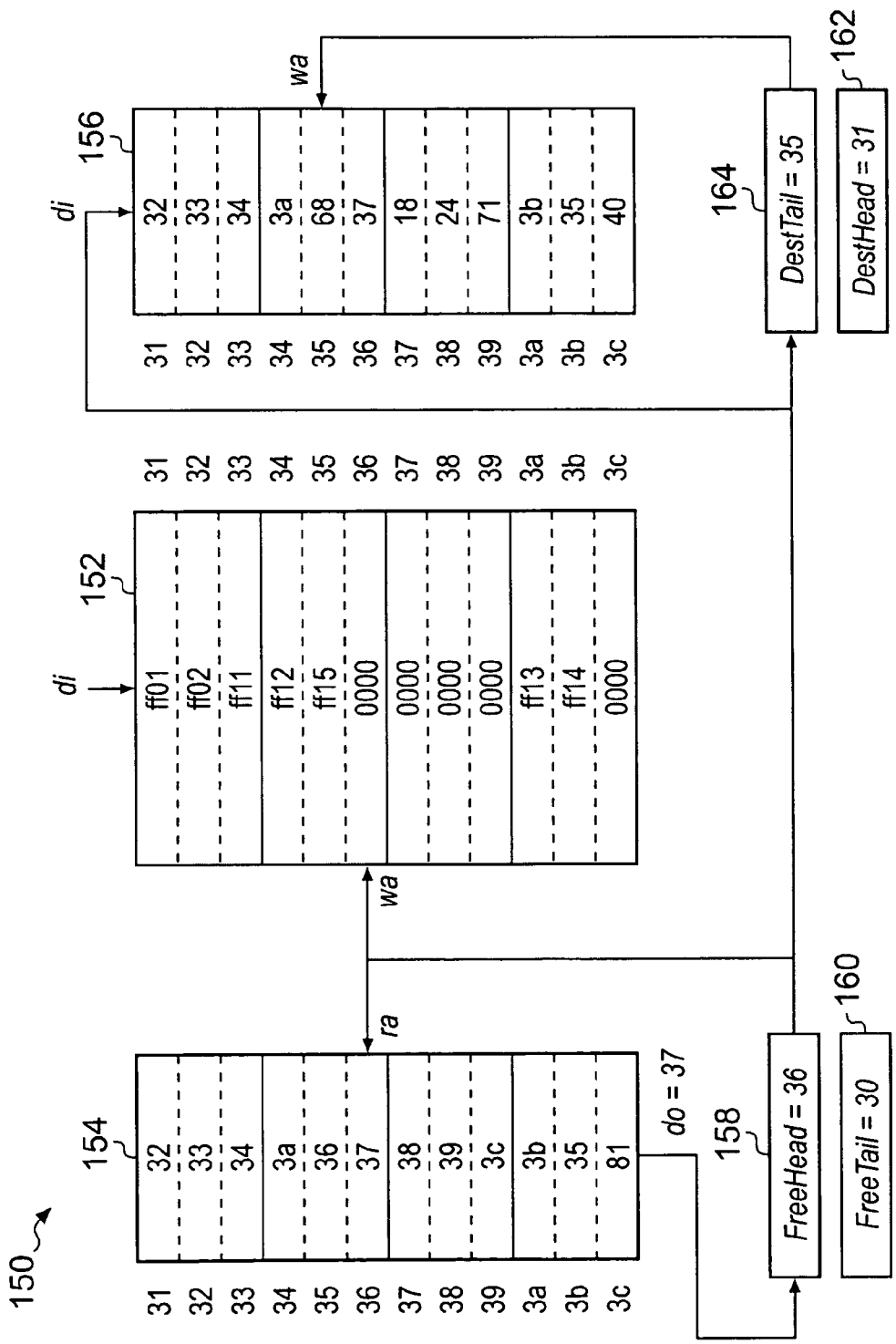

FIG. 11 illustrates the status at the end of the fifth write cycle following steps as described above with respect to FIG. 6, but starting from the status represented in FIG. 10, whereby the packet having the value ff15 has been stored in the packet RAM 152 and the free head pointer 158, the destination tail pointer 164, the free RAM 154 and the destination RAM 156 have been updated. FIG. 11 thus shows the contents of the pointers 158, 160, 162 and 164 and of the RAMs 152, 154, 156 when all the five lines of the packet have been written into the input buffer.

A new packet may now be received, which packet may be either for the same or for a different destination port.

As indicated above, the destination head pointer 162 and the destination tail pointer 164 illustrated in FIGS. 6 to 11 are for one specific destination port. It should be noted that if the next packet is for another output port, then another pair of destination head and tail pointers will be used. As mentioned above, the free head pointer 158 and the free tail pointer 160 are shared for all destinations when the input port and packet category are the same.

However, if multiple input ports and/or multiple packet types are supported, the respective sets of free head and tail pointers 158 and 160 may also be provided.

Figure 12:
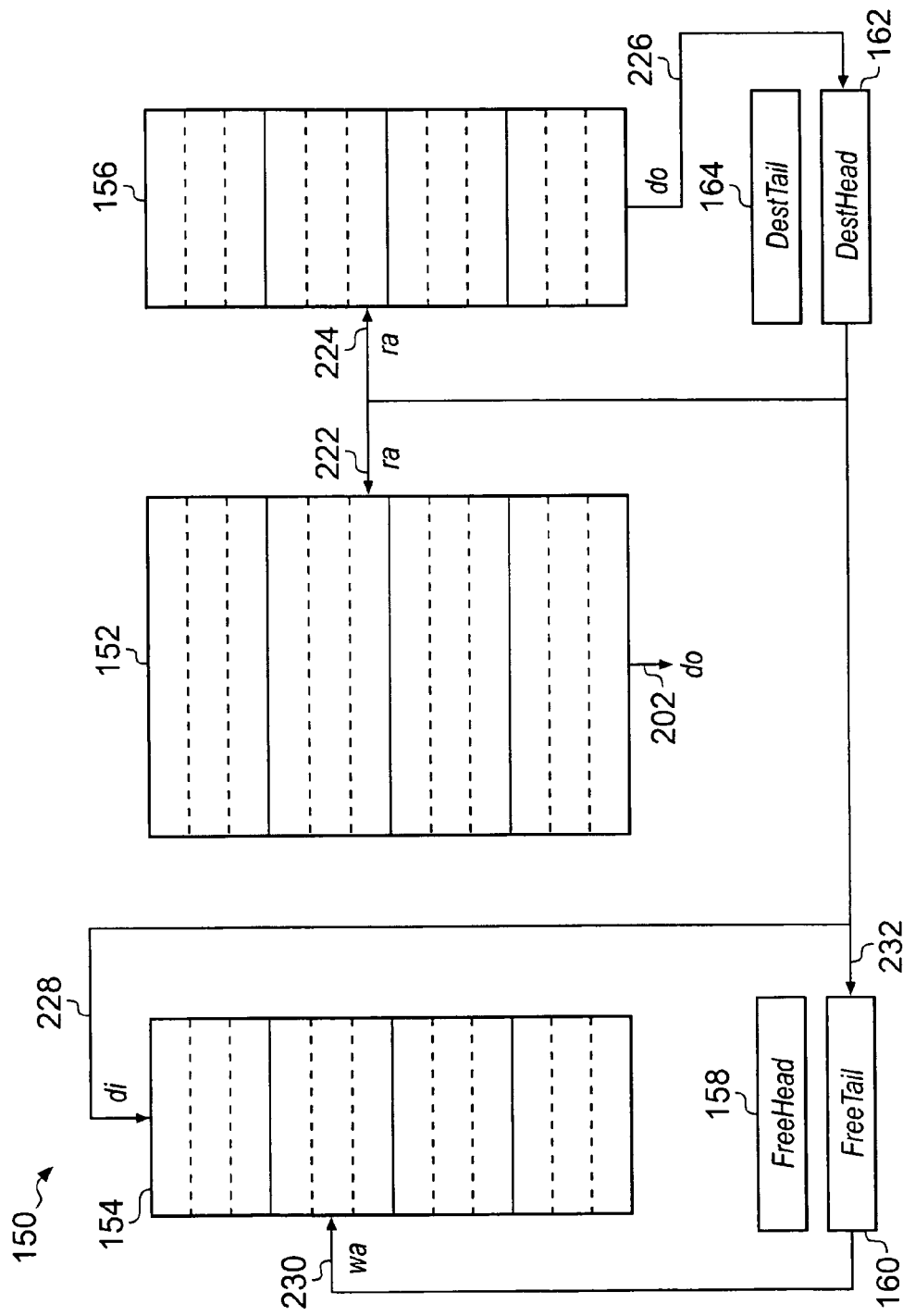

FIG. 12 is a schematic diagram giving an overview of the operation of the input buffer when a packet is forwarded to a destination. When a packet is forwarded 220 from the input buffer 150 (e.g., to an output port 133), the respective lines of the packet are read out from locations in the packet RAM identified in respective cycles by the content of the destination head pointer 162. In each cycle, the address of the location from which the packet data is read 222 is used as a read address 224 for the destination RAM 156 to identify the next content 226 of the destination head pointer 162. When a line of a packet is forwarded, the location for that line of the packet becomes free and its location is moved to the end of the free list in the free RAM. This is done by writing 228 the current content of the destination head pointer 162 to the entry 230 of the free RAM 154 identified by the content of the free tail pointer 160. The current content of the destination head pointer 162 is also then used 232 to form the new content of the free tail pointer 160, making the freed entry become the new tail of the free list.

An example of operation of the input buffer 150 on the forwarding of a packet will now be described in more detail with reference to FIGS. 13 to 17. In this example, for reasons of ease of explanation, these Figures relate to only one possible destination, whereby one destination list is represented in the destination RAM 156, and only one destination head pointer 162 and one destination tail pointer 164 are shown. It will readily be apparent that the described example could be modified to provide separate destination lists for each of a plurality of destinations by providing a respective destination head pointer 162 and destination tail pointer 164 for each destination, with the appropriate pointers being employed for a given packet according to its destination as determined by the packet decode logic 136 shown in FIG. 3.

Figure 13:
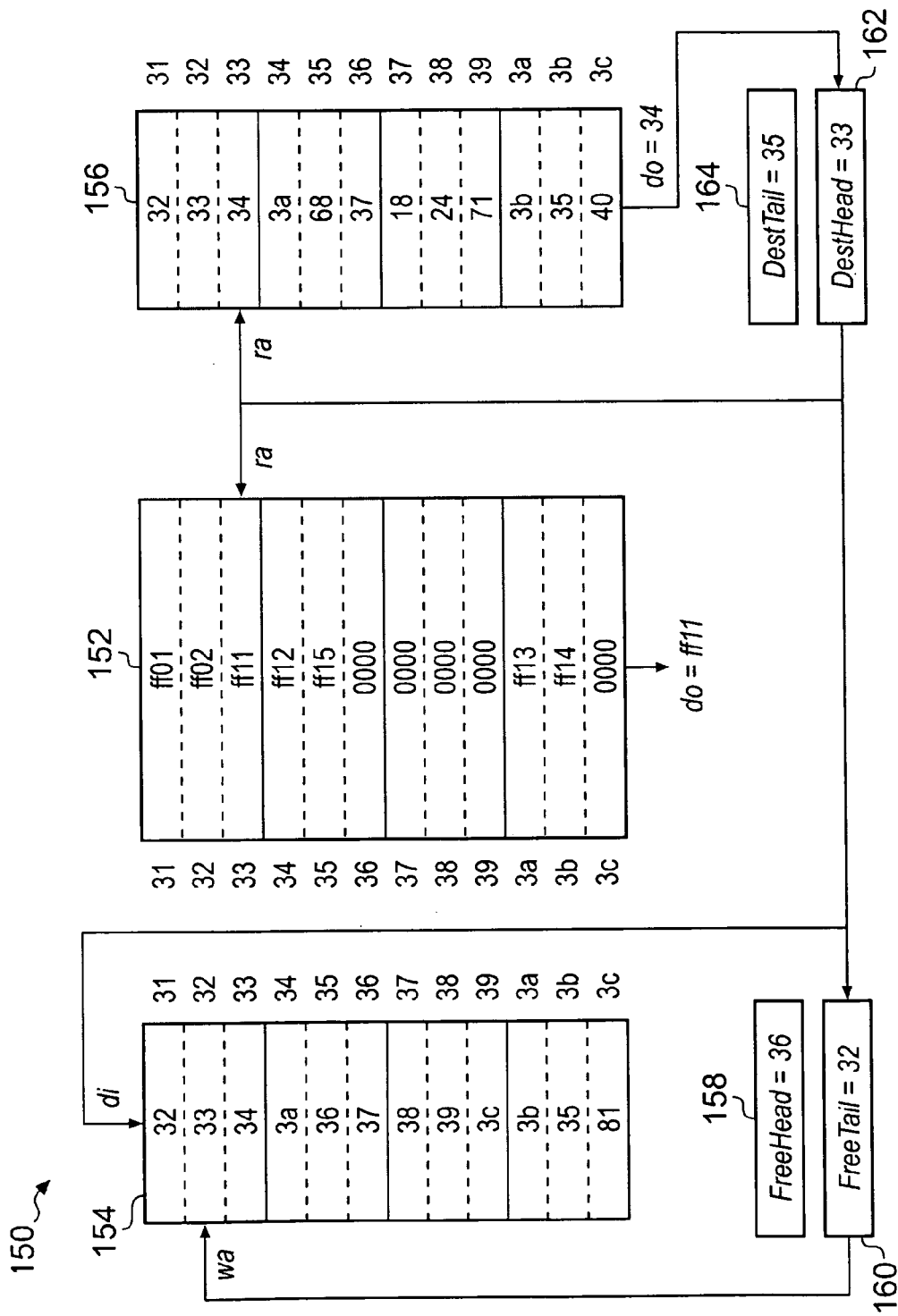

FIG. 13 illustrates the initial status of this example, which is assumed to start some time after the example described above with reference to FIGS. 6 to 11 has ended. Since the end of the previous example, the packet that was stored in location 31 and 32 has been forwarded from the input buffer 150. This has resulted in the free tail pointer 160 changing from 30 to 32, and the destination head pointer 162 for the destination of the stored packet changing from 31 to 33. The packet that was written into the packet RAM 152 in the previous example is now about to be forwarded from the input buffer, for example to an output port.

FIG. 13 illustrates the status at the start of a first read cycle. The destination head pointer 162 content, which identifies the location of the first entry of the stored packet, is 33. The value ff11 is read out of the packet RAM 152. The destination head pointer 162 content identifies the destination RAM 156 entry where the location of the second line of the packet is stored in the packet RAM 152. At this time, the value of entry 33 of destination RAM 156 is 34, which in the next cycle will become the new destination head pointer 162 content. Entry 33 is appended to the end of the free list by writing the value 33 into the entry 32 of free RAM 154 identified by the current free tail pointer 160 content. The free tail pointer 160 content will subsequently become the value 33, indicating that entry 33 will after this be the last element of the free list.

It should be noted that updates to the content of the free RAM 152 are not easily apparent in the Figures since the entry contents are not cleared when they are not in use, and since they hold the same linked list when they were in use last time. Because of this, the stored content is the same as the content already stored in the free RAM. In operation, it will normally only be when several packets to different destinations are forwarded that the free RAM values change.

Figure 14:
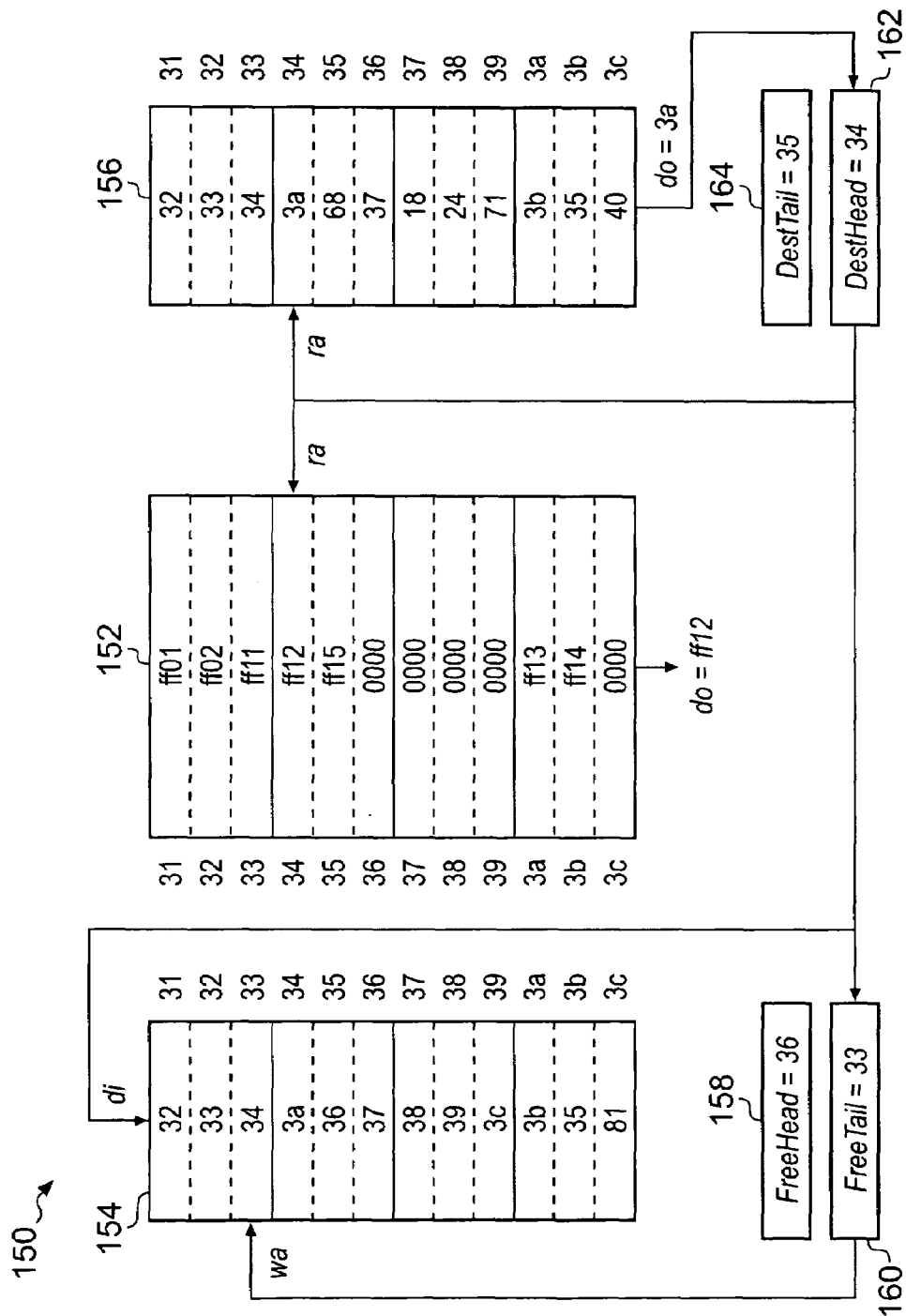

FIG. 14 illustrates the status at the end of the first read cycle and the start of the second read cycle. A value ff12 is to be read from the packet RAM 152 entry 34 identified by the destination head pointer 162 content. The free tail pointer 160 content has now changed to identify entry 33. The output of the destination RAM 156 is in this cycle 3a, making the head of the destination list jump to from 34 to this entry 3a.

Figure 15:
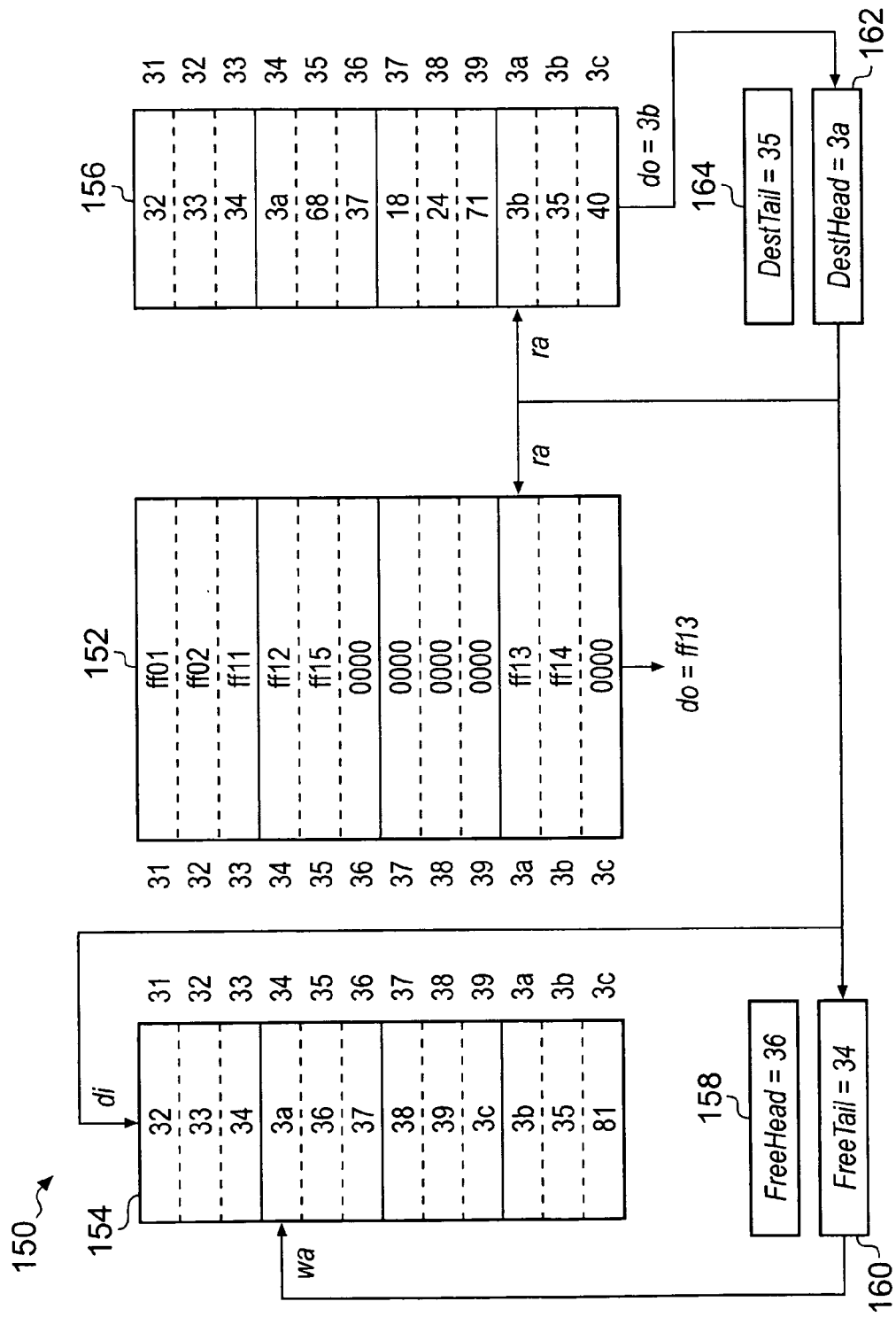

FIG. 15 illustrates the status at the end of the second read cycle and the start of the third read cycle. A value ff13 is to be read from the packet RAM 152 entry 3a identified by the destination head pointer 162 content. The free tail pointer 160 content has now changed to identify entry 34. The output of the destination RAM 156 is in this cycle 3b, making the head of the destination list change from 3a to 3b.

Figure 16:
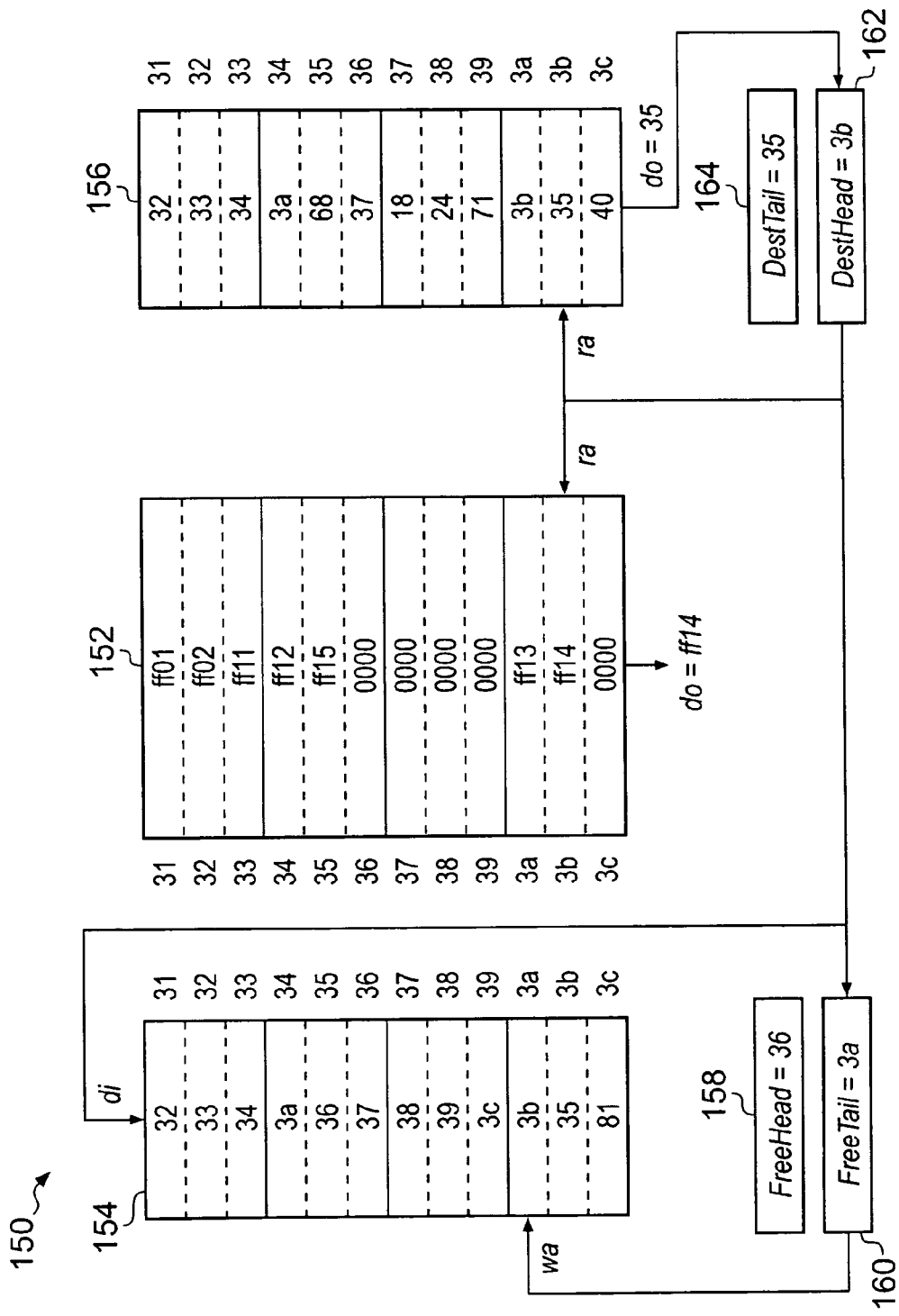

FIG. 16 illustrates the status at the end of the third read cycle and the start of the fourth read cycle. A value ff14 is to be read from the packet RAM 152 entry 3b identified by the destination head pointer 162 content. The free tail pointer 160 content has now changed to identify entry 3a. The output of the destination RAM 156 is in this cycle 35, making the head of the destination list jump back to entry 35.

Figure 17:
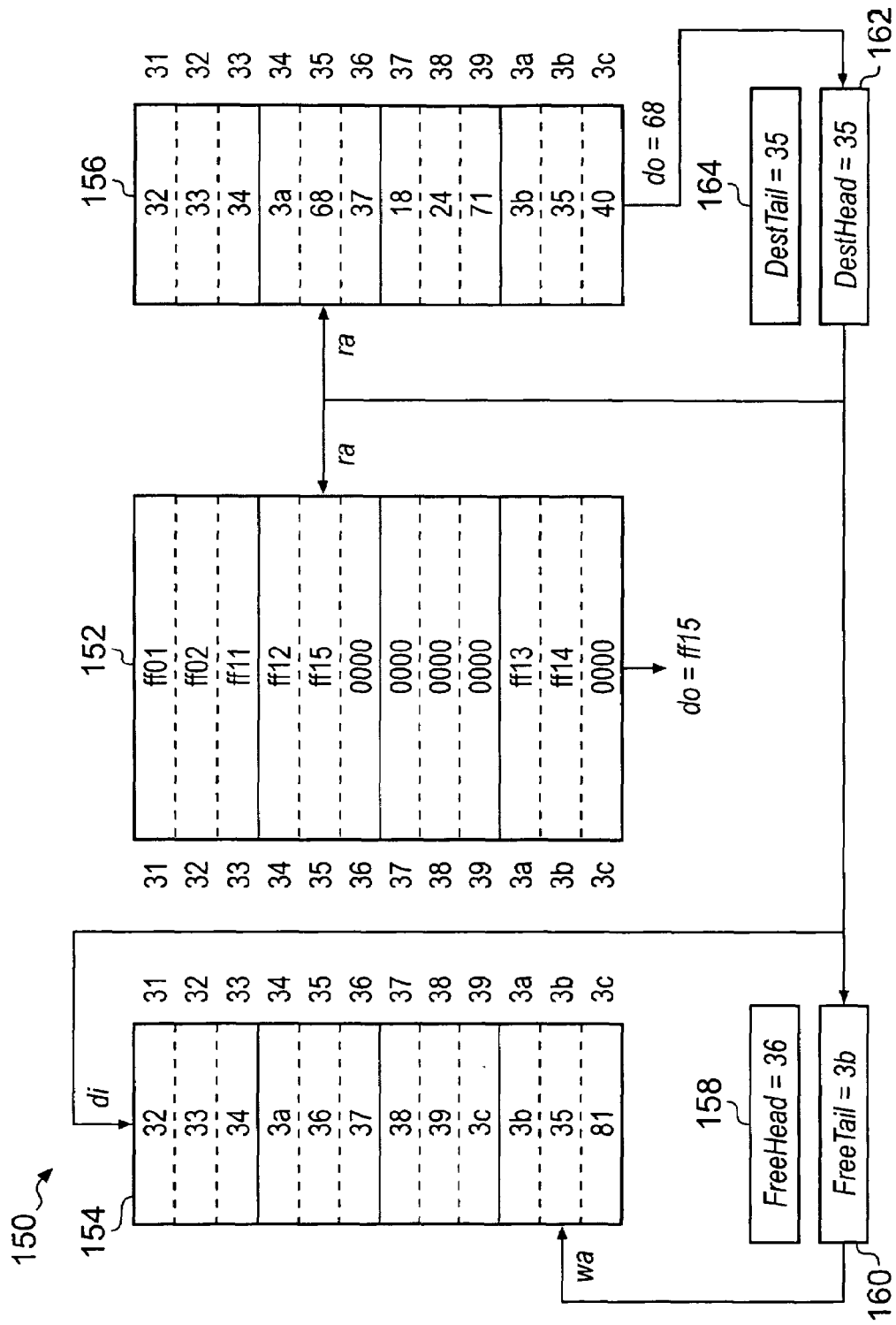

FIG. 17 illustrates the status at the end of the fourth read cycle and the start of the fifth and last read cycle. A value ff15 is to be read from the packet RAM 152 entry (35) identified by the destination head pointer 162 content. The free tail pointer 160 content has now changed to identify entry 3b. The output of the destination RAM 156 is in this cycle 68.

The free tail pointer content will be set to value 35 in the next cycle, making entry 35 the last entry of the free list. The whole packet has now been forwarded.

There has been described a method and apparatus that can provide a buffer architecture that enables linked lists to be used in administering virtual output queue buffering in a wide range of applications, for example in a high performance switch where packets might be received and forwarded every cycle.

A buffer has been described with three random access memories (RAMs), a data RAM for holding data, a free RAM for holding at least one linked list of entries defining free space in the data RAM and a destination RAM for holding at least one linked list defining data in the data RAM to be forwarded to a destination.

A separate linked list of entries can be maintained in the free RAM for each of a plurality of input sources and/or data types. A separate linked list of entries can be maintained in the destination RAM for each of a plurality of destinations and/or data types.

Pointers or other links can be used to identify the head and tail of respective linked lists.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. Apparatus comprising a buffer, the buffer comprising a first memory having a plurality of entries operable to contain packet data to be buffered, a second memory having a corresponding plurality of entries operable to contain a list of first memory packet data entries not in use and a third memory having a corresponding plurality of entries operable to contain a list of first memory packet data entries in use.

2. The apparatus of claim 1, wherein the second and third memories each comprise the same number of entries as the first memory.

3. The apparatus of claim 1, wherein each first memory entry has a corresponding entry in each of the second and third memories.

4. The apparatus of claim 1, comprising a second memory head pointer that identifies a head of the list in the second memory of first memory packet data entries not in use and a second memory tail pointer that identifies a tail of the list in the second memory of first memory packet data entries not in use.

5. The apparatus of claim 4 configured to be operable when a packet is received at the buffer to write the packet to an entry in the first memory corresponding to a second memory entry identified by the content of the second memory head pointer and then to use the second memory entry identified by the content of the second memory head pointer to replace the content of the second memory head pointer.

6. The apparatus of claim 4 configured to be operable when a packet is forwarded from the buffer to write to the second memory entry identified by the content of the second memory tail pointer the identity of the location in the second memory corresponding to the first memory entry location from which the packet was forwarded and then to use the identity of the location in the second memory corresponding to the first memory entry location from which the packet was forwarded to replace the content of the second memory tail pointer.

7. The apparatus of claim 1, further comprising a third memory head pointer that identifies a head of the list in the third memory of first memory packet data entries in use and a third memory tail pointer that identifies a tail of the list in the third memory of first memory packet data entries in use.

8. The apparatus of claim 7 configured to be operable when a packet is received at the buffer to write to the third memory entry identified by the third memory tail pointer the identity of the third memory entry corresponding to the first memory entry at which the packet data is stored and to then to replace the content of the third memory tail pointer with the identity of the of the third memory entry corresponding to the first memory entry at which the packet data is stored.

9. The apparatus of claim 7 configured to be operable when a packet is to forwarded from the buffer to forward the packet from the first buffer entry corresponding to the third memory entry identified by the content of the third memory head pointer and then to use the content of the third memory entry identified by the third memory head pointer to replace the content of the third memory head pointer.

10. The apparatus of claim 1, further comprising, for each of a plurality of destinations, a third memory head pointer that identifies a head of a list in the third memory of first memory packet data entries in use for that destination and a third memory tail pointer that identifies a tail of the list in the third memory of first memory packet data entries in use for that destination.

11. The apparatus of claim 10 configured to be operable when a packet is received at the buffer to write to the third memory entry identified by the third memory tail pointer for a destination of that packet the identity of the third memory entry corresponding to the first memory entry at which the packet data is stored and to then replace the content of the third memory tail pointer for that destination with the identity of the of the third memory entry corresponding to the first memory entry at which the packet data is stored.

12. The apparatus of claim 10 configured to be operable when a packet is to be forwarded to a destination from the buffer to forward the packet from the first buffer entry corresponding to the third memory entry identified by the content of the third memory head pointer for that destination and then to use the content of the third memory entry identified by the third memory head pointer to replace the content of the third memory head pointer for that destination.

13. The apparatus of claim 1, wherein the buffer is a virtual output buffer.

14. The apparatus of claim 1, wherein at least one of the first, second and third memories is a random access memory.

15. The apparatus of claim 1, wherein the buffer forms part of an interconnect device having an input port and at least one output port, the buffer being connected to receive a packet from the input port and to forward a packet to a said output port.

16. An interconnect apparatus comprising an input port, at least one output port and a buffer connected to the input port and the or each of the output ports, the buffer comprising a first memory having a plurality of entries operable to buffer packets received from the input port, a second memory operable to maintain a list of free first memory entries in corresponding second memory entries and a third memory operable to maintain, for the or each output port, a list of first memory entries having packets for forwarding to that output port in corresponding third memory entries.

17. The apparatus of claim 16, comprising a respective head and tail pointer for each list in each of the second and third memories.

18. A method of providing a virtual output buffer for buffering packets to be forwarded to at least one destination, the method comprising buffering packets received at the buffer in entries in a first memory, maintaining in corresponding entries in a second memory a list of free first memory entries and maintaining in corresponding entries in a third memory a respective list of first memory entries containing packets to be forwarded to the or each destination.

19. The method of claim 18, maintaining a respective head and tail pointer for each list in each of the second and third memories.

* * * * *